United States Patent [19]

Baker

[11] Patent Number: 4,746,091
[45] Date of Patent: May 24, 1988

[54] CONSTANT FORCE SUSPENSION SYSTEM

[75] Inventor: Irwin Baker, Rancho Palos Verdes, Calif.

[73] Assignee: Hughes Aircraft Company, Los Angeles, Calif.

[21] Appl. No.: 876,011

[22] Filed: Jun. 19, 1986

[51] Int. Cl.⁴ ............................................. F16M 11/16
[52] U.S. Cl. .................................. 248/603; 248/176; 248/571; 248/675
[58] Field of Search .............. 248/176, 603, 604, 675, 248/560, 580, 638, 571, 310, 188.1

[56] References Cited

U.S. PATENT DOCUMENTS

| | | | |
|---|---|---|---|
| 2,756,952 | 7/1956 | Gazley | 248/638 X |
| 3,145,910 | 8/1964 | Jolly | 248/628 X |
| 3,473,771 | 10/1969 | Newman | 248/188.4 |
| 4,211,383 | 7/1980 | Starcevic | 248/603 |
| 4,365,771 | 12/1982 | Halwes | 248/638 X |
| 4,436,119 | 3/1984 | Shahan et al. | 248/604 X |

FOREIGN PATENT DOCUMENTS

| | | | |
|---|---|---|---|
| 832237 | 4/1960 | United Kingdom | 248/560 |
| 1000205 | 8/1965 | United Kingdom | 248/603 |

*Primary Examiner*—Ramon S. Britts
*Assistant Examiner*—Karen J. Chotkowski
*Attorney, Agent, or Firm*—S. M. Mitchell; M. J. Meltzer; A. W. Karambelas

[57] ABSTRACT

A suspension system for rigidly mounting an object such as a microwave cavity on a support surface subject to limited expansion and contraction. The object is secured in place by three or more support legs radially spaced from a central reference point and angularly spaced from each other, each leg being specially configured to permit limited radial movement of the underlying surface relative to the object, but to resist relative movement in all other directions. The forces applied to the mounted object, therefore, remain fixed regardless of expansion or contraction of the underlying support surface.

1 Claim, 1 Drawing Sheet

U.S. Patent   May 24, 1988   4,746,091
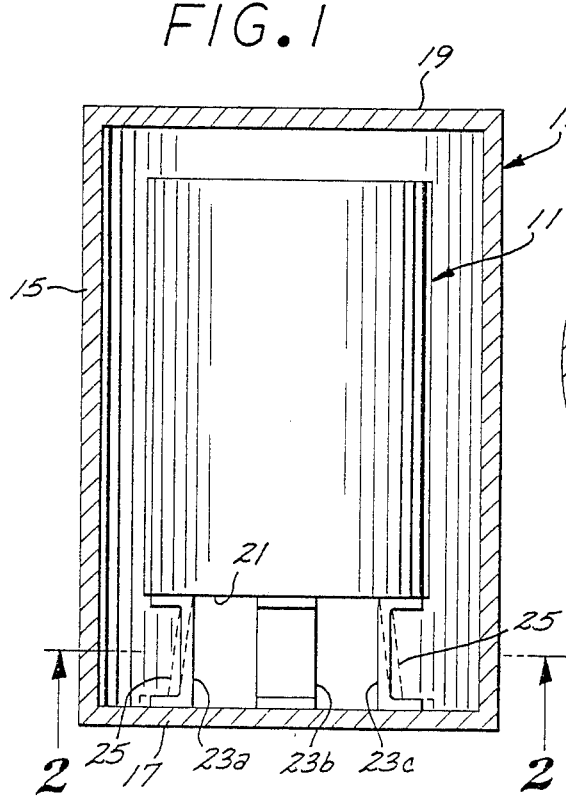
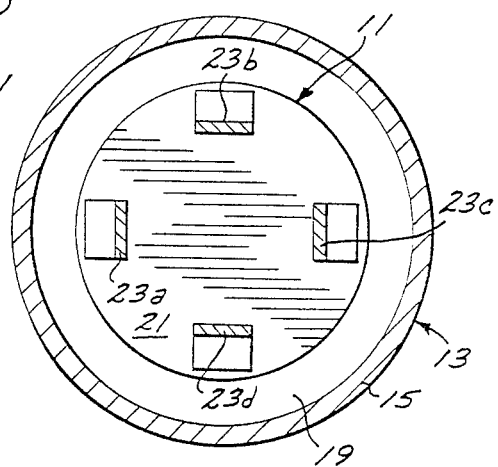
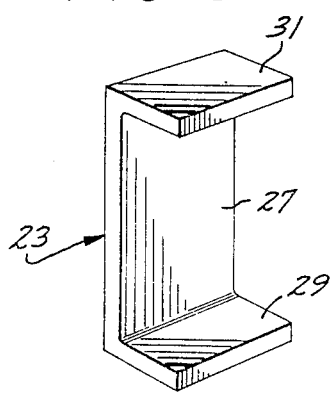
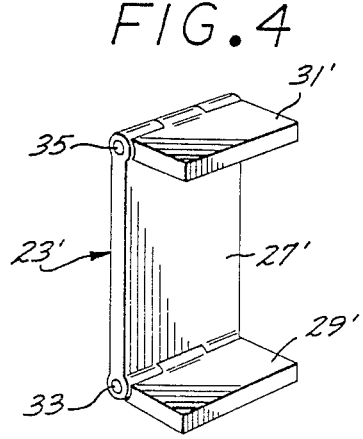

CONSTANT FORCE SUSPENSION SYSTEM

This invention was made with Government support under Contract No. N00014-83-C-2120 awarded by the Department of the Navy. The Government has certain rights in this invention.

BACKGROUND OF THE INVENTION

This invention relates generally to systems for rigidly mounting objects on a support surface, and, more particularly, to mounting systems that isolate the mounted object from any forces caused by limited expansion or contraction of the support surface.

Mounting systems of this kind are particularly useful in mounting objects such as the microwave cavity of a hydrogen maser atomic clock in a cylindrical vacuum chamber. Successful operation of such a clock requires that its microwave cavity be tuned to a frequency that will precisely match the transition frequency of the hydrogen atom. Since the frequency of the microwave cavity is directly related to its dimensions, once tuned, the cavity dimensions must be held constant. It is, therefore, usually essential that forces acting on the cavity, e.g., the forces holding it in place, remain fixed. This requirement for fixed forces has proven generally difficult to meet in the past, because the dimensions of the vacuum chamber in which the microwave cavity is located are, themselves, usually subject to substantial changes due to temperature and pressure variations. Both the length and the radius of the vacuum chamber can frequently vary, to at least a limited extent. The mounting for the microwave cavity must permit this limited expansion and contraction of the vacuum chamber's dimensions, without changing the forces applied to the cavity.

One known prior structure for mechanically mounting a microwave cavity preloads the cavity in compression between the circular end plates of the vacuum chamber using a series of Bellville springs. These springs, when appropriately dimensioned, have a characteristic in which they can accommodate a range of deflection without changing their compressive load. The length of the vacuum chamber can thereby expand or contract, within the limits of the Bellville springs' flat region, without changing the compressive load on the cavity. Radial expansion or contraction of the vacuum chamber is prevented from inducing variable loads on the cavity by placing ball bearings in radial slots between the pre-compressed stack of Bellville springs and the vacuum chamber's end plates.

The Bellville spring and ball bearing structures described above function effectively in isolating the microwave cavity from the effects of any uniform expansion or contraction of the surrounding vacuum chamber. However, this structure has not proven to be entirely satisfactory. It has required the use of a large number of individual parts, including rings, bearings and Bellville springs, and it has required a very exact pre-compression load, which complicates its assembly and requires special tooling in the form of loading jacks to facilitate chamber closure.

It should, therefore, be appreciated that there is a need for an effective, yet less complex, constant force suspension system that isolates a mounted object from any forces caused by limited expansion or contraction of a support surface. The present invention fulfills this need.

SUMMARY OF THE INVENTION

This invention relates generally to apparatus for rigidly mounting an object on a surface in a way that isolates the object from any variations in applied forces resulting from a uniform expansion or contraction of an underlying support surface, this isolation being achieved without the need for any pre-loading and without the need for any special springs or bearings. The mounting apparatus includes support means having at least three support legs connected between the mounting surface and the object to be mounted. Each support leg is connected to the object at a unique support location radially spaced from a predetermined, central reference location on the object, and angularly spaced from the support locations for the other support legs. In accordance with the invention, the support means are adapted to permit relative movement of the object and the mounting surface along radial axes aligned between the respective support locations and the central reference location, but substantially no relative movement in other directions. The support means is a much simpler structure than prior supports, yet it is completely effective in isolating the mounted object from any force variations that otherwise might occur because of uniform expansion or contraction of the underlying mounting surface.

More particularly, the apparatus of the invention has particular utility in securely mounting a microwave cavity, such as is included in a hydrogen maser atomic clock, in a generally cylindrical vacuum chamber. The suspension apparatus isolates the microwave cavity from the effects of any variations in the vacuum chamber's radius or length. The suspension apparatus includes means for securing the opposite ends of the support legs to the respective vacuum chamber and microwave cavity, at angularly-spaced support locations. The support legs and securing means permit limited displacement or pivoting of one end of each leg with respect to the other in a radial plane, but are relatively rigid and highly resistant to such displacement or pivoting in other planes. In this way, relative variations in the vacuum chamber's length and radius have little or no effect on forces applied to the cavity.

In more detailed aspects of the invention, the microwave cavity includes a generally circular base and the support legs are connected to the base at locations uniformly spaced around its periphery. In addition, the support legs are all substantially the same length, such that the cavity's base is mounted in spaced, substantially parallel relationship with the vacuum chamber's end wall.

Each support leg can conveniently be substantially planar, with minimal thickness and with its plane oriented substantially perpendicular to a radial axis. It thus provides minimal resistance by bending to relative radial movement of the microwave cavity and the underlying vacuum chamber end wall. The opposite ends of the leg can be secured to the respective microwave chamber base plate and vacuum chamber end wall either directly or by means of hinges which are perpendicular to the radial axis. When secured directly, the very low resistance to radial displacement is caused by the low bending stiffness of each leg due to its thin planar configuration. When secured by means of hinges, the legs are free to pivot and there will be essentially no resistance to radial displacement.

Other aspects and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 1 is a sectional elevational view of a constant force mounting system embodying the present invention, for mounting a microwave cavity within a vacuum chamber;

FIG. 2 is a sectional view of the mounting system, taken substantially in the direction of the arrows 2—2 in FIG. 1;

FIG. 3 is an enlarged perspective view of one embodiment of the support leg included in the mounting system of FIG. 1; and FIG. 4 is an enlarged perspective view of an alternative embodiment of a support leg suitable for use in the mounting system of FIG. 1.

DESCRIPTION OF THE PREFERRED EMBODIMENTS

With reference now to the drawings, and particularly to FIGS. 1 and 2, there is shown a preferred embodiment of a mechanical suspension system for mounting a hydrogen maser microwave cavity 11 within a cylindrical vacuum chamber 13. To stabilize the maser's operating frequency, it is essential that any external forces applied to the cavity remain fixed at all times. Since the vacuum chamber's length and radius ordinarily vary with temperature and pressure, it is important, therefore, to isolate the cavity from any force variations that could be included by such length and radius variations. At the same time, however, the cavity must be supported with sufficient rigidity to withstand acceleration forces that occur during normal handling.

The vacuum chamber 13 includes a cylindrical wall 15 and two planar, circular end walls 17 and 19. The microwave cavity 11, which is also generally cylindrical, includes a planar, circular base 21. The microwave cavity is suspended in its place within the vacuum chamber by four spaced-apart legs 23a–23d, which are secured between one end wall 17 of the chamber and the base 21 of the cavity.

In accordance with the invention, each of the four support legs 23a–23d is specially configured to rigidly secure the microwave cavity 11 to the vacuum chamber 13, while offering no significant resistance to relative radial expansion or contraction of the vacuum chamber's end wall 17 relative to the microwave cavity's base 21. In this way, the chamber's dimensions can vary, within certain limits, without causing any corresponding variations in the forces applied to the microwave cavity, to hold it in place. The cavity's operating frequency, therefore, will remain substantially constant, regardless of these dimensional variations.

More particularly, the four support legs 23a–23d are connected to the underside of the microwave cavity's base 21 at locations adjacent to its circular periphery, 90 degrees apart from each other. Each support leg is flat and thin and is oriented with its plane substantially perpendicular to a radial axis. The leg can thereby act as a leaf spring and pivot to at least a limited degree in a radial plane, as indicated by the dotted reference lines 25, but is highly resistant to pivoting in other planes.

FIG. 3 depicts in greater detail a support leg 23 like the four support legs 23a–23d of FIGS. 1 and 2. The leg is like a flexible leaf spring, with an upright, center section 27 and two end sections 29 and 31 projecting outwardly from the opposite ends of the center section. One end section 29 can be secured by any suitable means to the vacuum chamber's end wall 17, and the other end section 31 can be secured to the underside of the microwave cavity's base 21. The special planar shape of the center section permits limited flexing, as depicted by the dotted lines 25 in FIG. 1.

FIG. 4 depicts an alternative support leg 23' for use in the suspension system of FIG. 1. The FIG. 4 leg differs from the leg 23 of FIG. 3 in that its center section 27' is secured to its two end sections 29' and 31' by hinge pins 33 and 35, respectively. This leg, therefore, offers substantially no resistance to pivoting movement of the center section. Like the leg of FIG. 3, the end sections can be rigidly secured to the base 21 of the microwave cavity 11 and the end wall 17 of the vacuum chamber 13 by any suitable means.

Although the special suspension system of the invention is adapted to permit expansion and contraction of the vacuum chamber 13 relative to the microwave cavity 11, the system behaves as a substantially rigid structure in response to all other movements of the vacuum chamber. All lateral forces applied to the chamber are transmitted to the cavity by the four support legs 23a–23d. This occurs because any such lateral force can be resolved into component forces that lie in the planes of the various support legs.

Although the suspension system embodiment of FIGS. 1 and 2 is shown to include four separate support legs 23a–23d, those skilled in the art will appreciate that any other number of legs not less than three could also function effectively. Regardless of the number of legs, it is desirable, but not necessary, to distribute the legs substantially uniformly about the microwave cavity's periphery. In each case, the legs should be configured to permit relative radial movement of the respective vacuum chamber 13 and microwave cavity 11, but resist relative movement in other directions.

As previously mentioned, the radius and length of the vacuum chamber 13 are generally subject to variations, to at least a limited degree. Variations in the chamber's radius are accommodated by the special configuration of the support legs 23a–23d. Length variations, on the other hand, are accommodated because the microwave cavity 11 is secured to merely one end wall 17 of the chamber. This cantilevered configuration not only completely eliminates any undesired effects of length variations, but also greatly simplifies the suspension system's assembly.

It should be appreciated from the foregoing description that the present invention provides an improved suspension system for mounting an object such as a maser microwave cavity within a vacuum chamber whose dimensions are subject to variation. The microwave cavity is secured to just one end of the vacuum chamber by three or more specially configured support legs that permit limited radial movement of the chamber's end wall relative to the cavity, but that resist relative movement in non-radial directions.

Although the present invention has been described in detail with reference to the presently-preferred embodiments, those of ordinary skill in the art will appreciate that various modifications can be made without departing from the invention. Accordingly, the invention is defined only by the following claims.

What is claimed is:

1. Apparatus for rigidly mounting an object on a mounting surface in such a fashion that forces applied to the object from the surface are substantially constant, regardless of any uniform expansion or contraction of the surface relative to the object, said apparatus comprising:
- an object to be mounted on said mounting surface, said object having a predetermined, central reference location on it;
- at least three planar support legs connected between said mounting surface and said object each at a support location radially spaced from said central reference location and angularly spaced from adjacent support locations, each of said support legs being oriented with its plane substantially perpendicular to a radial axis; and
- means for securing said support legs to said object and to said mounting surface, said means for securing including flat end sections projecting away from opposite ends of each support leg and hinge means for pivotally securing said end sections to the opposite ends of said support legs and being adapted to permit limited pivoting movement of each support leg in a radial plane but resist pivoting movement of each leg in a plane perpendicular to the radial plane.

* * * * *